United States Patent

[11] 3,589,111

| [72] | Inventors | Myron Leroy Gullickson<br>Scotland, Ontario;<br>Donald Hector McNeill, Brantford,<br>Ontario, both of, Canada |
|---|---|---|
| [21] | Appl No. | 801,349 |
| [22] | Filed | Feb. 24, 1969 |
| [45] | Patented | June 29, 1971 |
| [73] | Assignee | White Motor Corporation of<br>Canada, Limited,<br>Brantford, Ontario, Canada |
| [32] | Priority | Apr. 17, 1968 |
| [33] | | Canada |
| [31] | | 017,685 |

[54] COMBINE HARVESTER
48 Claims, 18 Drawing Figs.

[52] U.S. Cl. .................................. 56/12.8,
    56/14.6
[51] Int. Cl. .................................. A01d 41/02
[50] Field of Search .......................... 56/20, 21,
    123, 124; 130/27.6, 27.17

[56] References Cited
UNITED STATES PATENTS

| 1,347,733 | 8/1920 | Davis .................... | 56/153 |
| 2,999,346 | 9/1961 | Mathews ................. | 56/1 |
| 3,481,342 | 2/1969 | Rowland-Hill et al. ....... | 130/27 |

*Primary Examiner*—Robert Peshock
*Attorney*—Greist, Lockwood, Greenawalt & Dewey ABSTRACT: A field crop harvester comprising a four-wheel vehicle with a crop-gathering header at the forward end having a sickle cutter and associated apparatus for gathering grain crops and delivering the same to a feeder blower which raises the material into the cone-shaped end of a horizontally disposed threshing cylinder which is mounted on an axis extending longitudinally of the vehicle frame, a horizontally disposed separator mounted on the same longitudinally extending axis and having an auger within a perforated tube which advances the material to a discharge opening at the rear of the tube, the threshing cylinder and separator extending through a grain storage tank disposed forwardly of the center of the vehicle and having associated grain augers disposed horizontally on parallel shafts which carry the separated grain from the threshing cylinder and the separator to a vertically disposed cleaner at the rear of the vehicle, which cleaner includes an auger mounted on a vertical axis enclosed within a perforated tube, which in turn is mounted in a cylindrical housing with a fan at the top for drawing the trash into a discharge chute while the grain thrown through the perforated tube drops to a collecting pan at the bottom and is directed into a slinger for transfer through a cooperating chute to a storage tank from which it may be withdrawn through an unloader slinger and chute.

INVENTORS
MYRON LEROY GULLICKSON
DONALD HECTOR McNEIL
BY
Grint, Lockwood, Tremault
& Dewey
ATTYS.

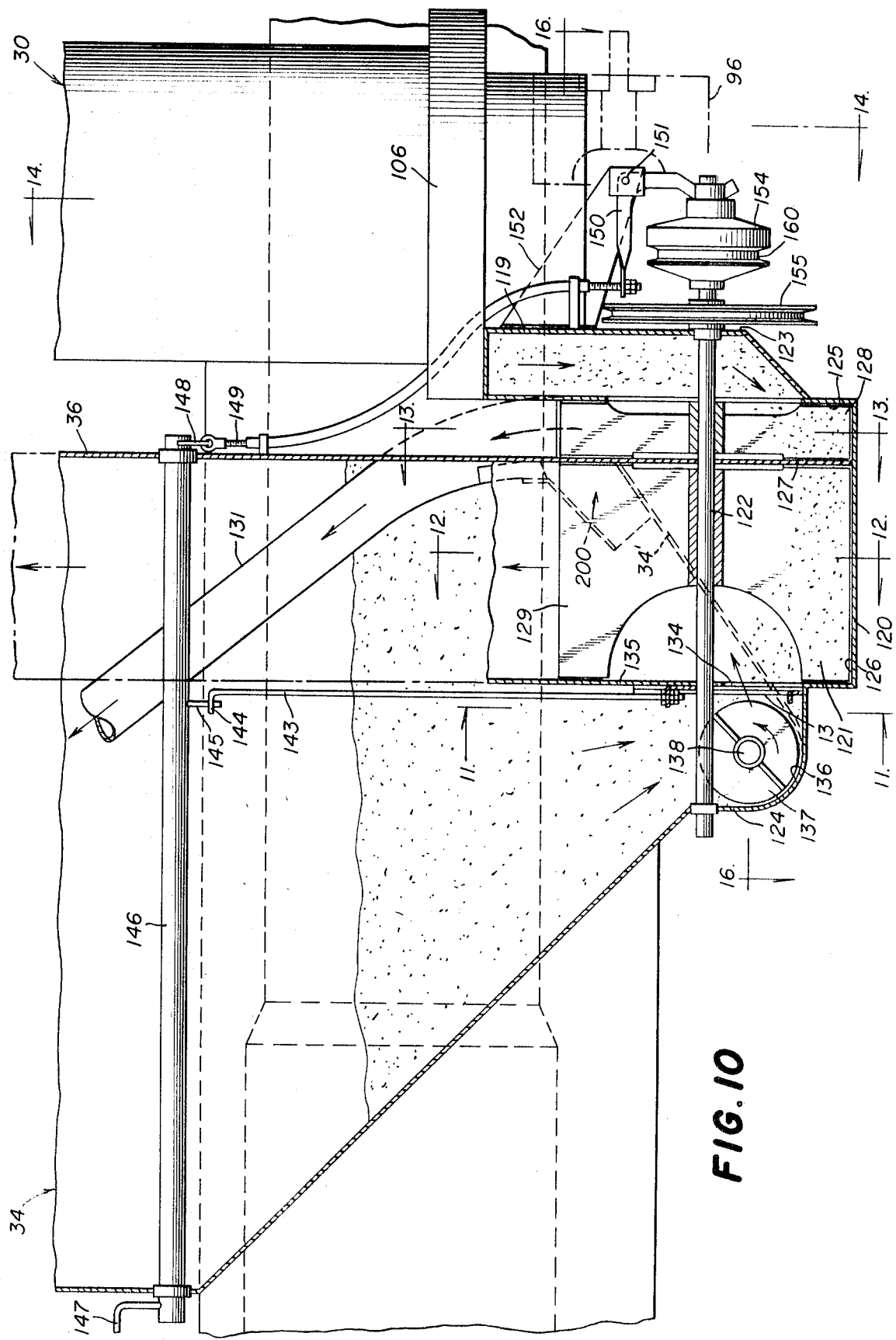

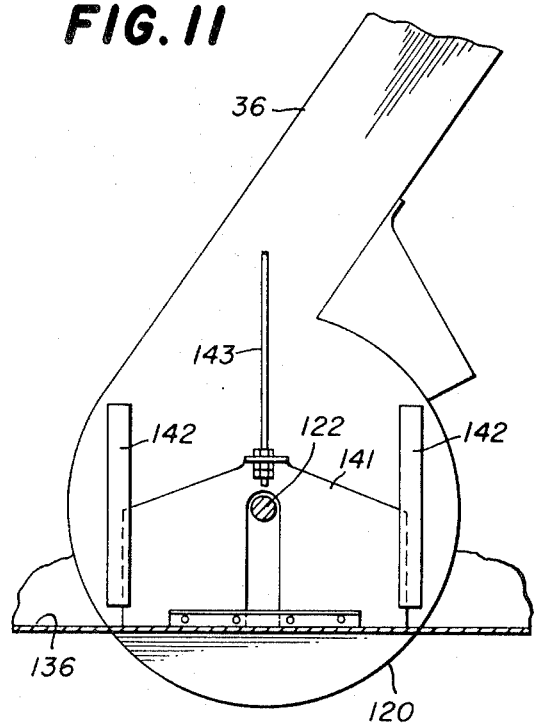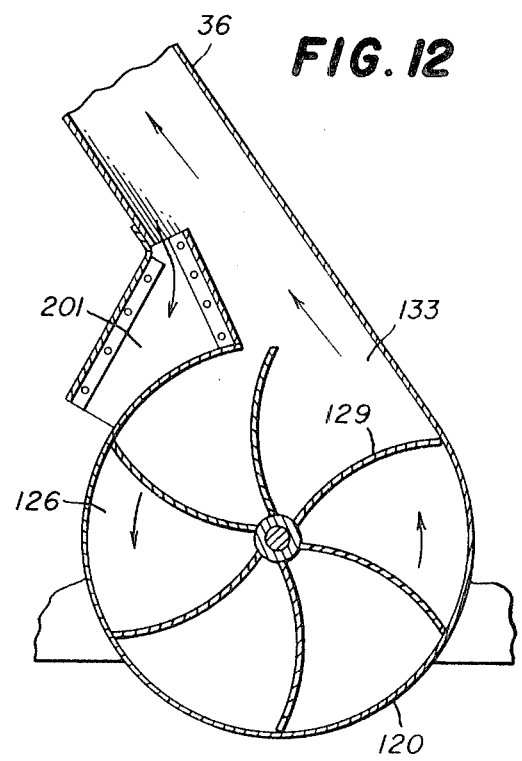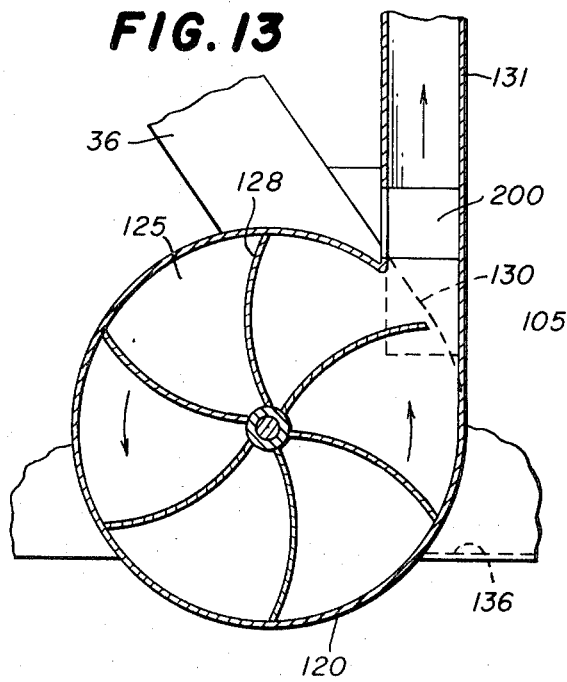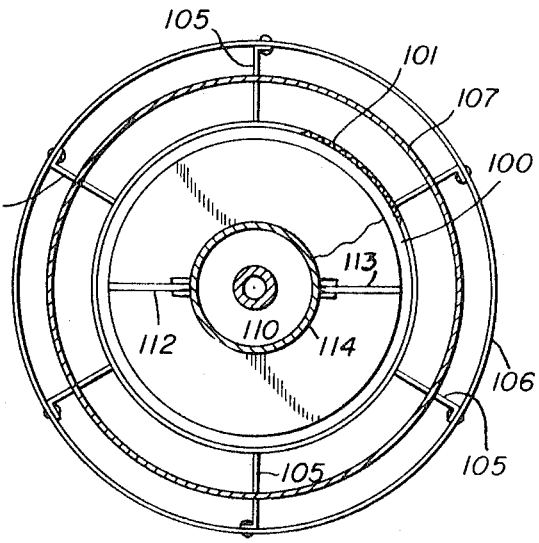

COMBINE HARVESTER

This invention relates to crop harvesting and is more particularly concerned with improvements in a combine harvester which incorporates in a single vehicle mounted unit mechanism for harvesting the crop and simultaneously threshing or separating the grain or the like so as to deliver the same in clean condition to a storage bin or other collecting receptacle.

It is a general object of the invention to provide a new and improved combine harvester which will perform with greater efficiency than similar machines heretofore provided the threshing, separating and cleaning operations involved in harvesting wheat, corn and similar grain crops.

A more specific object of the invention is to provide a combine harvester having a unique arrangement on a self-propelled vehicle of apparatus for threshing, separating and cleaning field crops such as wheat, corn and the like and for transporting the train or other product being harvested to a storage area while disposing of the stalks and other waste material or trash from which the grain is separated.

A further object of the invention is to provide a combine harvester having a threshing cylinder which more efficiently separates the kernels from their natural points of attachment and provides for a higher percentage of grain from trash at the threshing area with less kernel damage than possible with previous threshing cylinder arrangements.

Another object of the invention is to provide in a vehicle mounted combine harvester a threshing cylinder, separator, cleaner and storage arrangement wherein the threshing cylinder and separator are disposed longitudinally of the vehicle and provided with auger-type conveyor means for advancing the trash and grain from the front end to the back end of the vehicle and simultaneously separating the trash from the grain while they are moving to a trash disposal area and a cleaning apparatus, respectively, at the rear of the vehicle, with provision for delivering the cleaned grain from the cleaner to a storage tank from which it may be withdrawn through an unloader chute.

Still another object of the invention is to provide in a combine harvester of the type described a separator having a material advancing auger enclosed in an elongated tubular screen which enables a relatively thin layer of material to be advanced at a relatively rapid rate through the separator with special provisions for breaking up or agitating the material as it is advancing so as to obtain maximum separation.

It is a still further object of the invention to provide a machine for field operation which will harvest grain or the like and deliver the same to the infeed end of a horizontally disposed threshing cylinder mounted at the forward end of the machine and aligned with a horizontally disposed separator to which the material is delivered directly from the threshing cylinder and which advances the same to a discharge area at the rear of the machine, with the separated grain and fine trash resulting from the threshing and separating operations being transported by one or more horizontally disposed augers mounted below the threshing cylinder and separator and carrying the material to a vertically disposed cleaner in which the material is raised by an auger and thrown outwardly against a surrounding screen or grate while subject to an air stream for removing the chaff through a discharge chute and allowing the grain to fall to a collecting area from which it is delivered by a slinger through a chute to a storage tank which has an opening connecting with an unloader chute.

Another object of the invention is to provide an improved combine harvester wherein a horizontally disposed threshing cylinder is mounted with a separator on a common axis extending longitudinally of the supporting vehicle, with associated mechanism for advancing the separated grain and chaff to a vertically disposed cleaner at the rear of the machine which disposes of the chaff and delivers the cleaned grain to a grain storage tank through which the threshing cylinder and separator extend.

Still another object of the invention is to provide a vehicle-mounted threshing cylinder disposed within a cylindrical threshing grate for rotation on a horizontal axis extending longitudinally of the vehicle, with the threshing cylinder having a truncated cone at the front end section enclosed in a housing with an infeed opening which allows bulky material into the cylinder where it is compressed to a smaller volume as the cylinder rotates and the material is conveyed toward the rear of the machine by auger blades and operated upon by associated threshing bars.

A further object of the invention is to provide a threshing cylinder operating within a clam shell-type threshing grate having a mechanism for adjusting both halves of the grate simultaneously so as to vary the cylinder clearance and provide adequate opening for unplugging, inspection and servicing.

Another object of the invention is to provide in a combine harvester a horizontally disposed, auger-type separator operating inside a perforated tube which extends longitudinally of the machine and which has a discharge opening at the rear of the machine wherein the auger has flexible sweeps to assist in the separation of the grain from the trash and a blade with the periphery cut along chords for facilitating grain trash bunch breakup.

A still further object of the invention is to provide in a combine harvester having aligned threshing cylinder and separator one or more grain transporting augers operating on parallel shafts beneath the same which deliver the uncleaned grain to the bottom of a vertically disposed cleaner and sizer which includes a vertically disposed auger inside a perforated tube member and a cleaning fan located at the top of the cleaner and exhausting into a chaff discharge chute which is provided with a gate or damper for controlling the flow of air.

Another object of the invention is to provide a vehicle-mounted combine having a threshing cylinder and separator auger mounted on a common shaft and extending longitudinally of the vehicle through a grain storage tank, with a vertically disposed cleaner and the vehicle engine arranged on opposite sides of the vehicle frame at the rear thereof so as to provide even distribution of weight when loaded or unloaded.

A further object of the invention is to provide in a combine of the type described slinger apparatus for cooperating with grain tank loader and unloader chutes having backward curved blades which reduce radial velocity of the grain in the slinger housing so as to minimize grain damage.

A still further object of the invention is to provide in a combine harvester mechanism for separating the grain from the trash wherein the material is advanced within a perforated tube by an auger having a blade with the peripheral edge cut along chords to facilitate grain trash bunch breakup and agitation of the material as it is advanced.

These and other objects and advantages of the invention will be apparent from a consideration of the combine harvester which is shown by way of illustration in the accompanying drawings wherein:

FIG. 10 is a partial longitudinal section taken on the line 10–10 of FIG. 3, to an enlarged scale;

FIG. 11 is a fragmentary cross section taken on the line 11–11 of FIG. 10, to a still larger scale;

FIG. 12 is a fragmentary section taken on the line 12–12 of FIG. 10, to a larger scale;

FIG. 13 is a fragmentary cross section taken on the line 13–13 of FIG. 10, to a larger scale;

Figure 14:
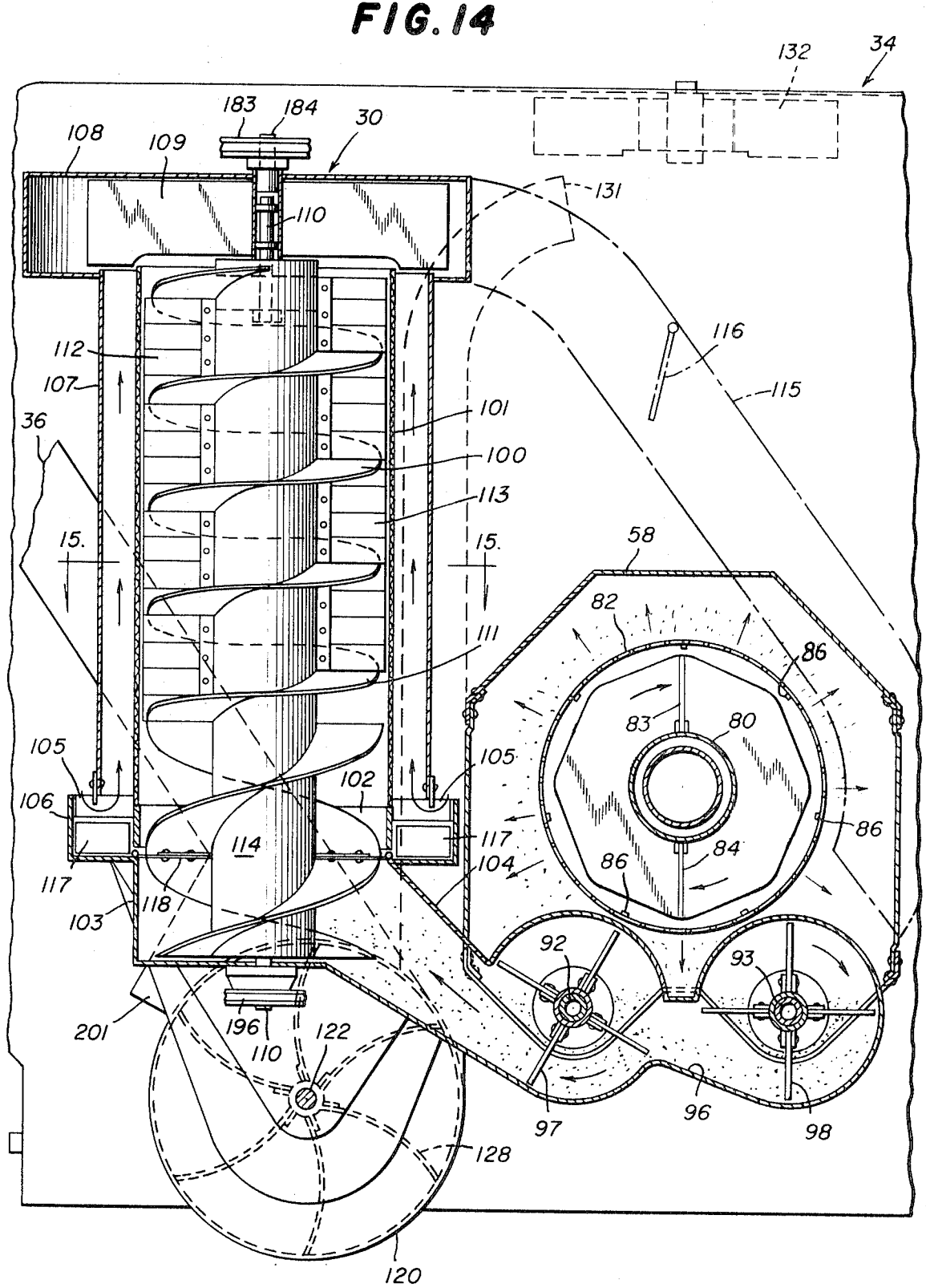
Figure 16:
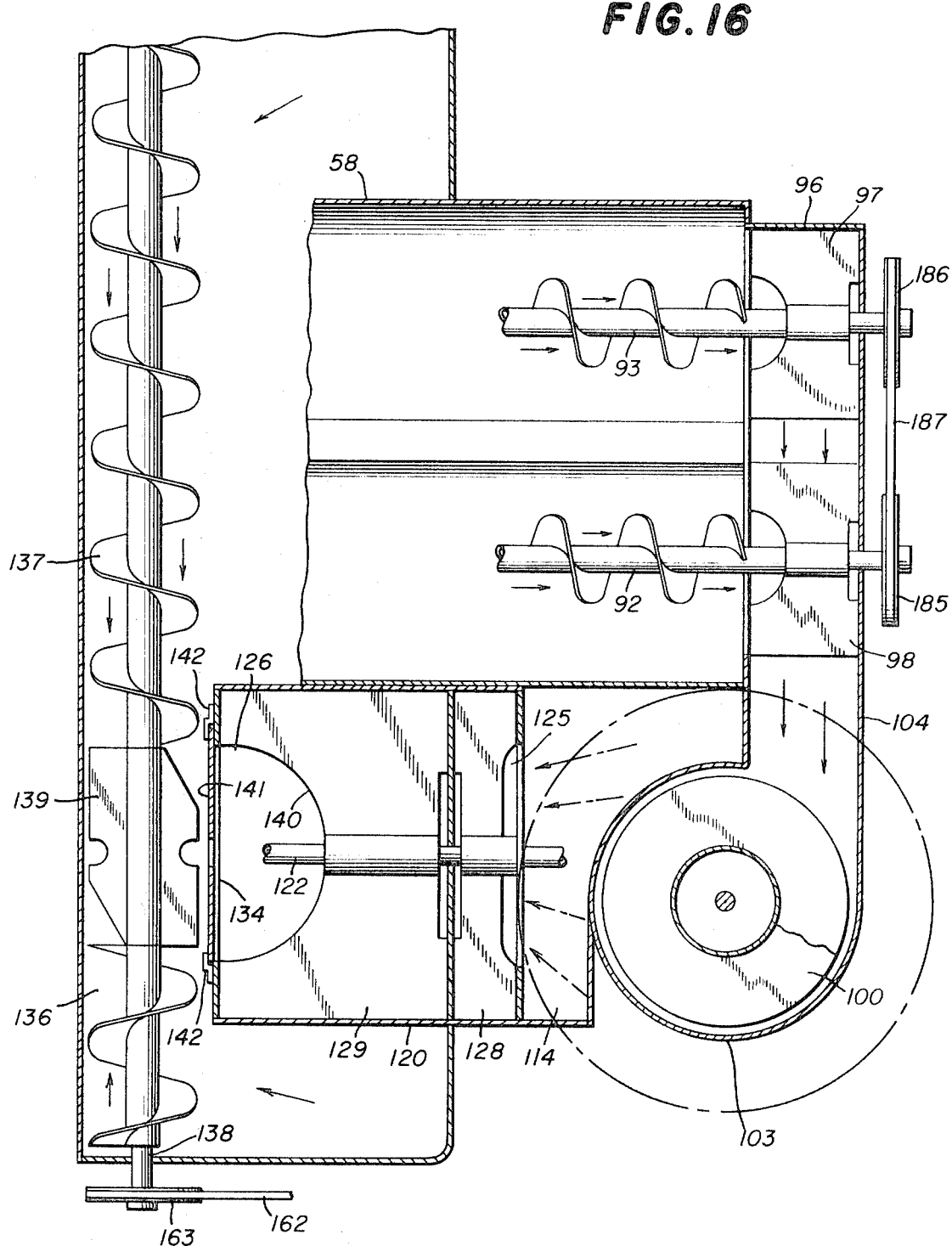
Figure 17:
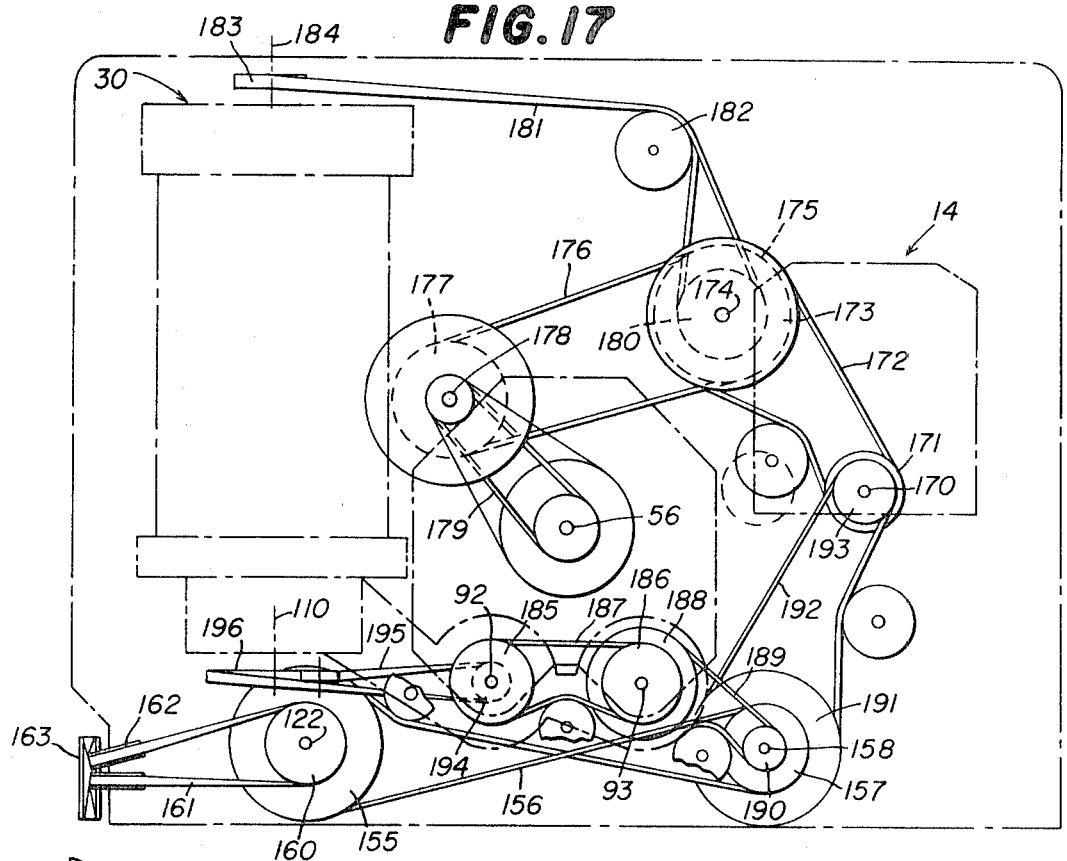
Figure 18:
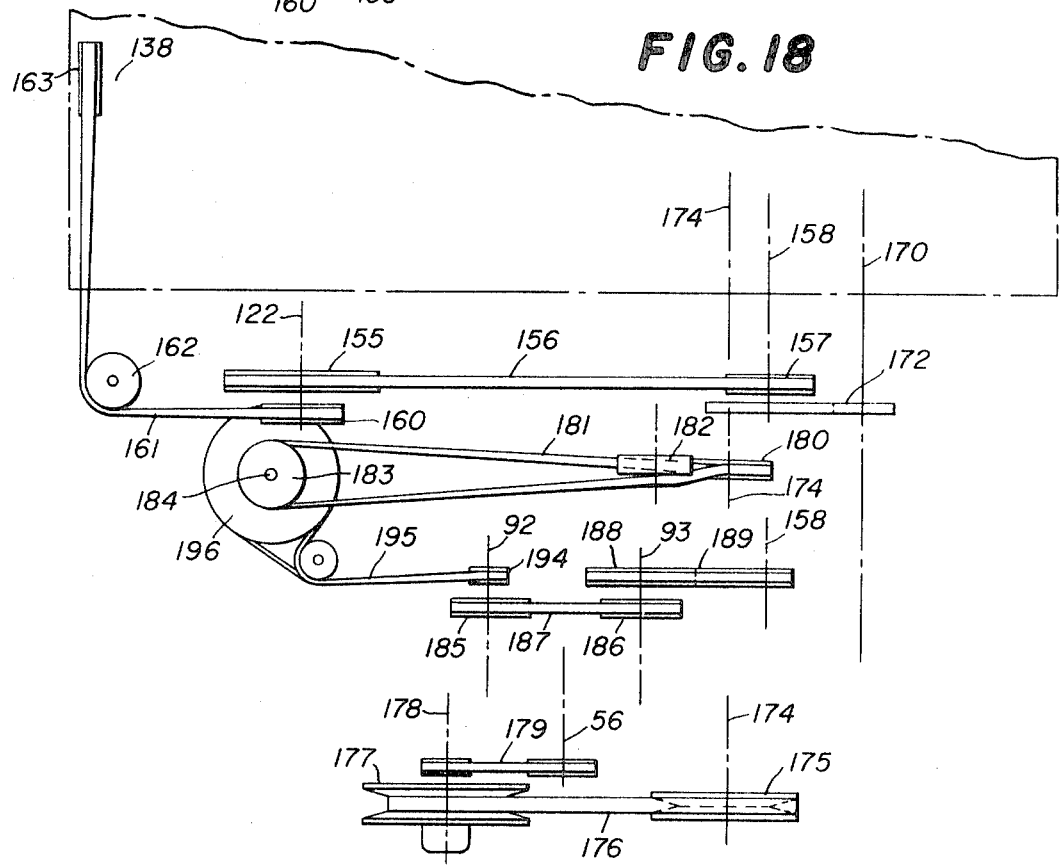

FIG. 14 if a cross section taken on the line 14–14 of FIG. 10;

FIG. 15 is a horizontal section taken on the line 15–15 of FIG. 14;

FIG. 16 is a horizontal section taken on the line 16–16 of FIG. 10;

FIG. 17 is a diagrammatic view in a vertical plane illustrating part of the drive mechanism; and FIG. 18 is a diagrammatic view in a horizontal plane further illustrating portions of the drive mechanism.

Figure 1:
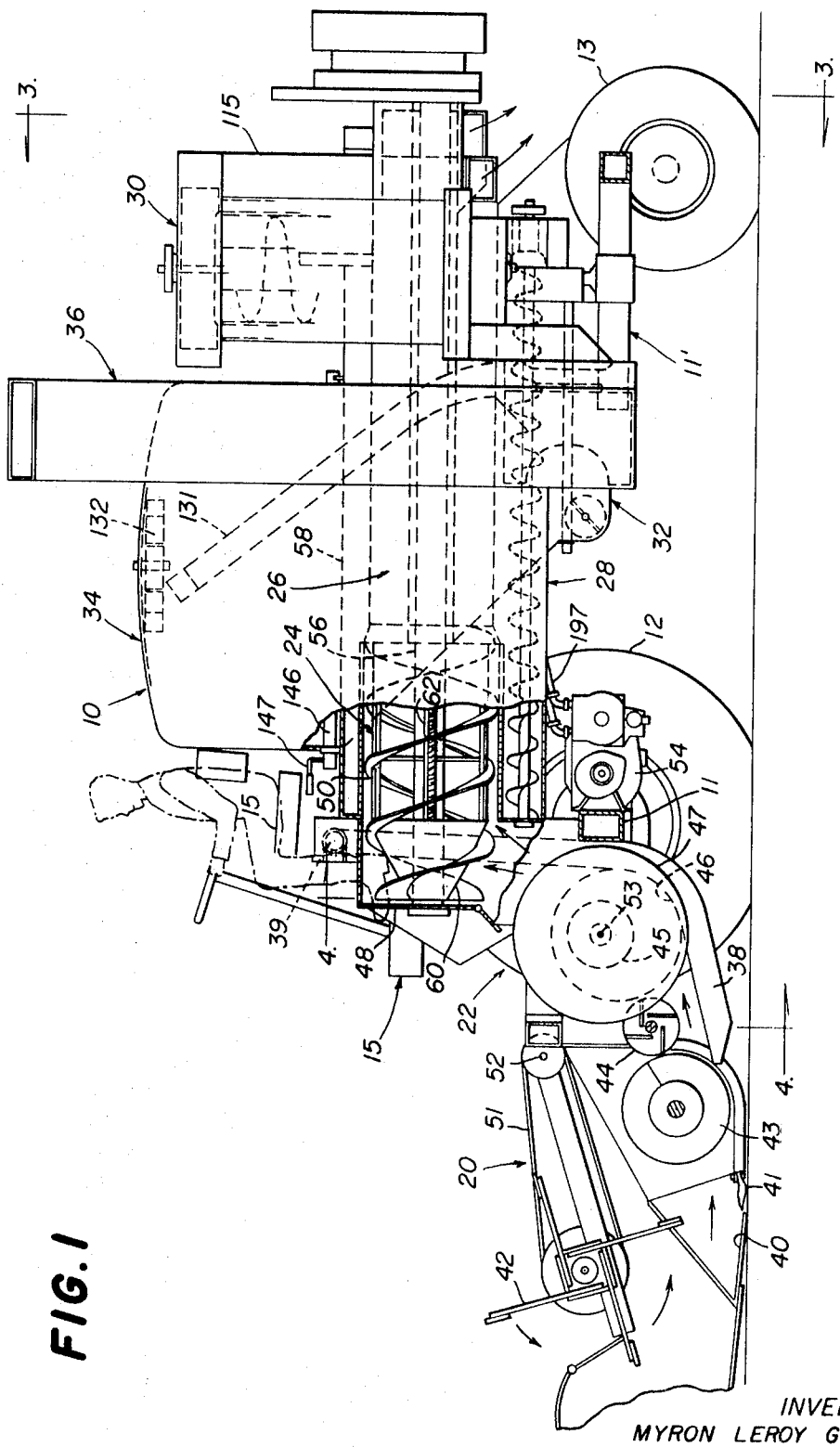
FIG. 1 is a side elevation with portions broken away of a self-propelled machine for harvesting grain which incorporates the principal features of the invention.
Figure 2:
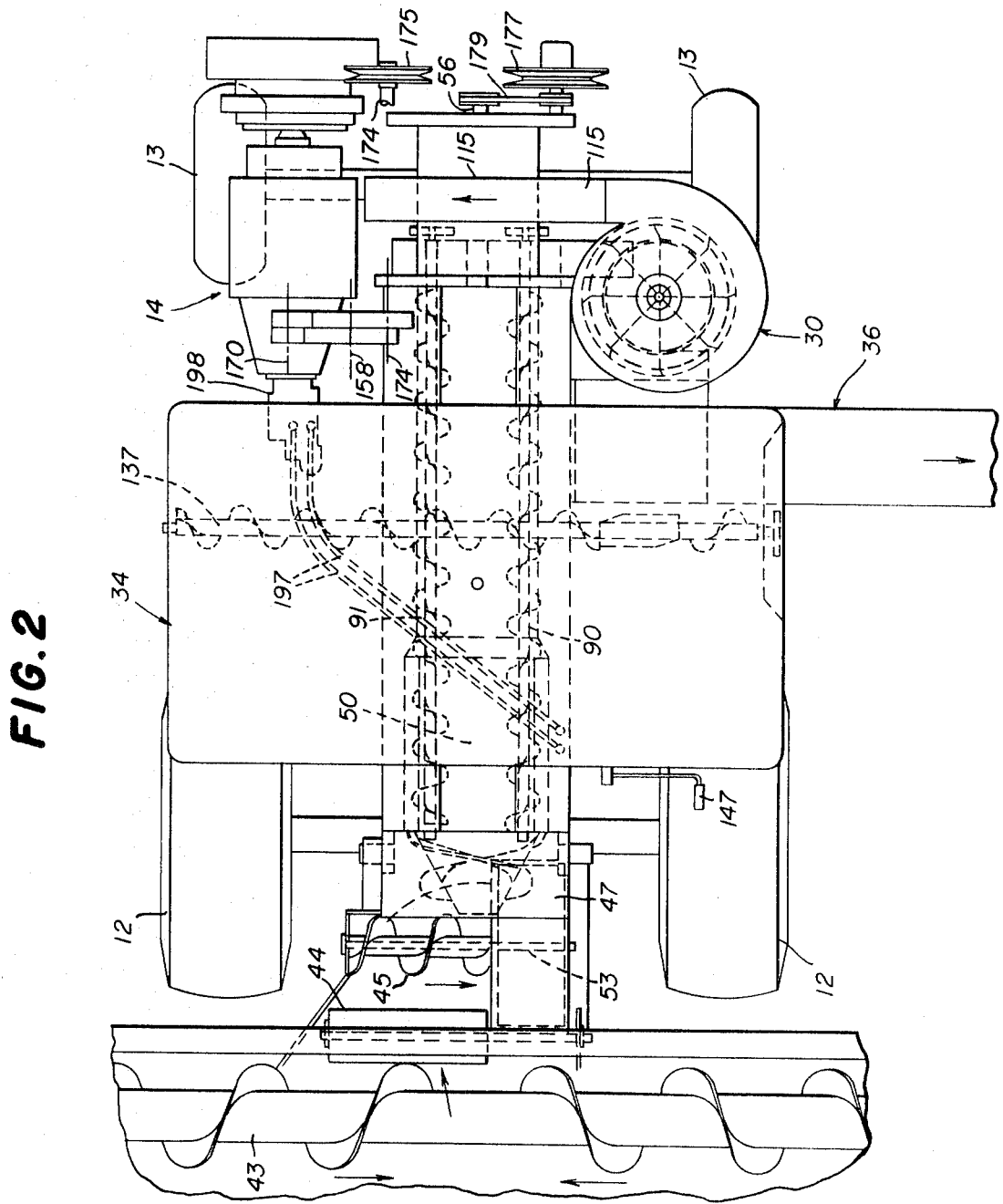
FIG. 2 is a partial plan view of the machine of FIG. 1, with portions broken away or omitted.
Figure 3:
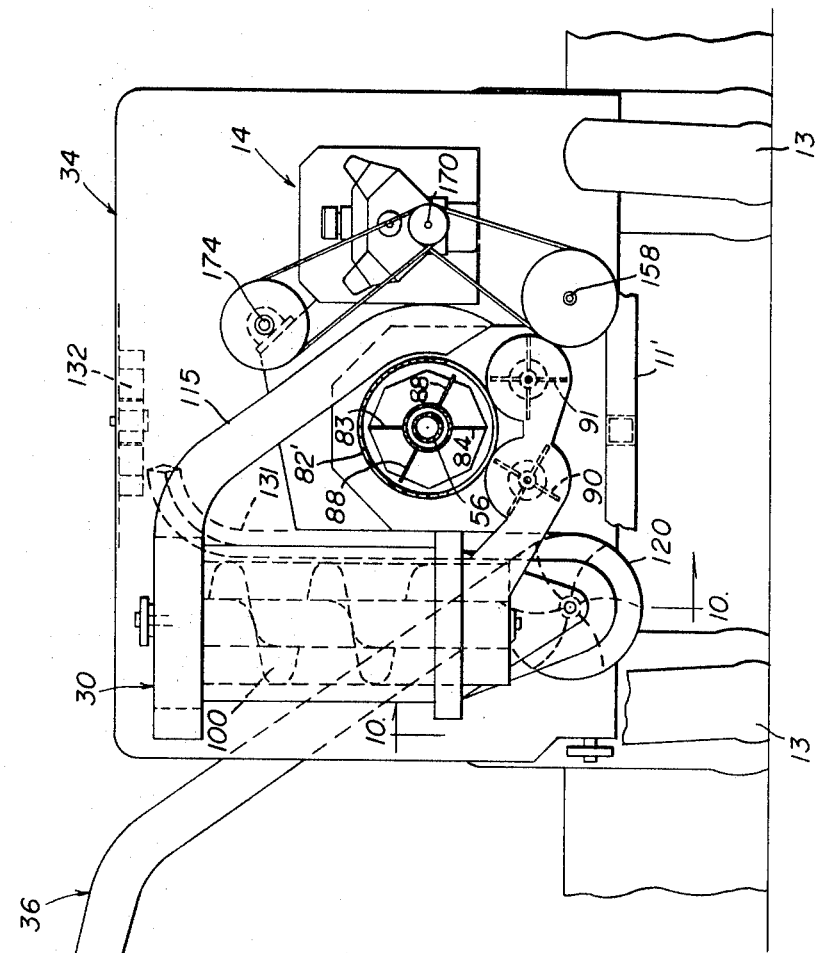
FIG. 3 is an elevational view taken on the line 3-3 and showing the rear end of the machine of FIG. 1.
Figure 4:
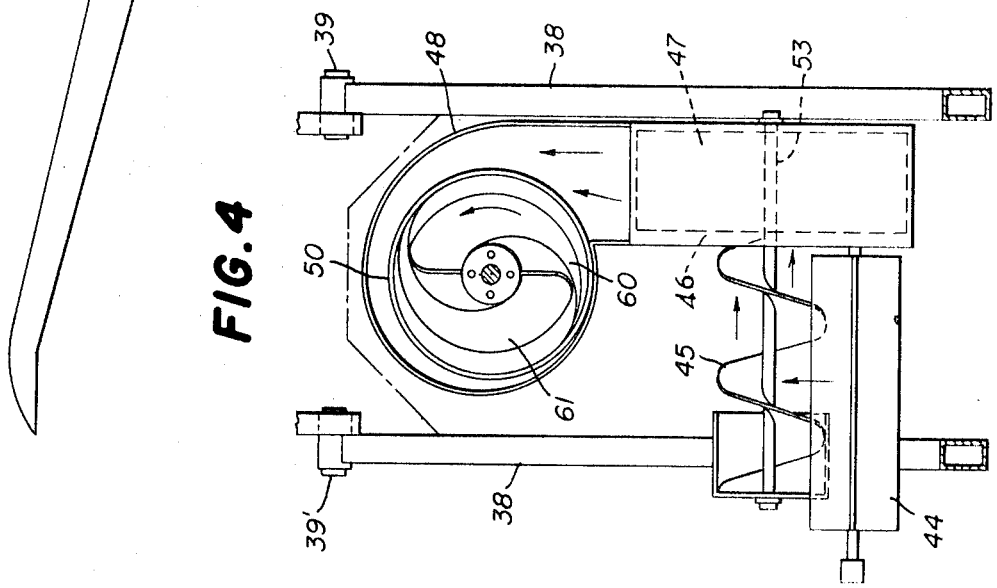
FIG. 4 is a vertical section taken on the line 4-4 of FIG. 1, to an enlarged scale.

Referring to FIGS. 1, 2 and 3 of the drawings, there is illustrated a harvesting combine 10 of the self-propelled-type which embodies the principal features of the invention and which is particularly adapted for harvesting grain crops, such as wheat, oats and corn, it being understood that the use of the machine is not limited to the harvesting of a particular crop and that the machine shown is selected for convenience in illustrating the principles of the invention. The illustrated machine 10 comprises a vehicle having a frame forming structure which is supported on the front wheels 12 and rear wheels 13, by use of axle assemblies 11 and 11′, the vehicle being driven by a suitable power plant or motor 14 mounted on the frame structure at one side of the rear thereof and being connected, through the hydraulic drive shown or a drive shaft and connecting gears elements, in driving relation with the front wheel axles. The rear wheels 13 are connected to a suitable steering mechanism under the control of an operator for whom a platform 15 is provided above the front wheels 12.

A header 20 is supported at the front end of the vehicle frame structure for cutting and gathering the crop material for delivery to a feeder or elevator assembly 22 which lifts the cut material to a horizontally disposed threshing cylinder assembly 24 mounted at the forward end of the machine on a longitudinally extending shaft on which there is a longitudinally aligned separator mechanism 26 to which the threshed material is delivered and carried to the rear of the machine. A grain transporting mechanism 28 having parallel augers is arranged below the thresher and separator mechanisms 24 and 26 for moving the mixture of grain and chaff resulting from the threshing and separating to a point beneath a vertically disposed cleaner 30 mounted at one side of the rear of the frame structure. The grain and chaff are separated in the cleaner 30 and the cleaned grain is delivered by slinger and chute to a grain storage tank 34, the latter being mounted forwardly of the center of the combine with the threshing cylinder and separator assemblies 24 and 26 extending through the same. A mechanism is provided for discharging the grain from the storage tank through an unloader chute 36. The chaff and other waste material are discharged in a controlled manner at the rear end of the machine. All the driven elements of the machine are powered from the vehicle engine 14. The various mechanisms are hereinafter described in detail.

The header 20 may be secured to the front of the machine so that it may be readily removed and replaced with a different header structure depending upon the particular crop being harvested. The grain cutting and gathering header shown (FIGS. 1 and 2) which is suitable for wheat, oats, etc., is supported on a tubular frame 38 which is pivoted at 39 to the vehicle frame structure. It includes a table 40 having a cutter bar 41 disposed beneath a reel 42, a gathering auger 43 having right and left spiral blades for carrying the material received from the cutter bar to the center of the header where beater 44 advances it to the cross auger 45 which feeds it into the side opening 46 in the blower 47 which drives the cut material upwardly and tangentially into a scroll-like housing 48 surrounding the front conical section of threshing cylinder 50. The reel 42 is connected by a pulley and drive belt assembly 51 with a cross-shaft 52. Suitable driving connections are provided for driving the cross-shaft 52, the auger 43, the feeder auger 45 and beater 44 and the auger and fan shaft 53 from the engine 14. A drive shaft or the like may be employed with a coupling to permit movement of the header about the pivot 39. The header may be pivoted by hydraulic rams to regulate cutting height above the ground. The airstream produced by the blower or fan 47 not only raises the material to the threshing cylinder 50 but it also creates a vacuum at the feed area from the header thereby promoting material flow and reducing dust and chaff in front of the machine which is bothersome to the machine operator on a conventional combine.

Figure 7:
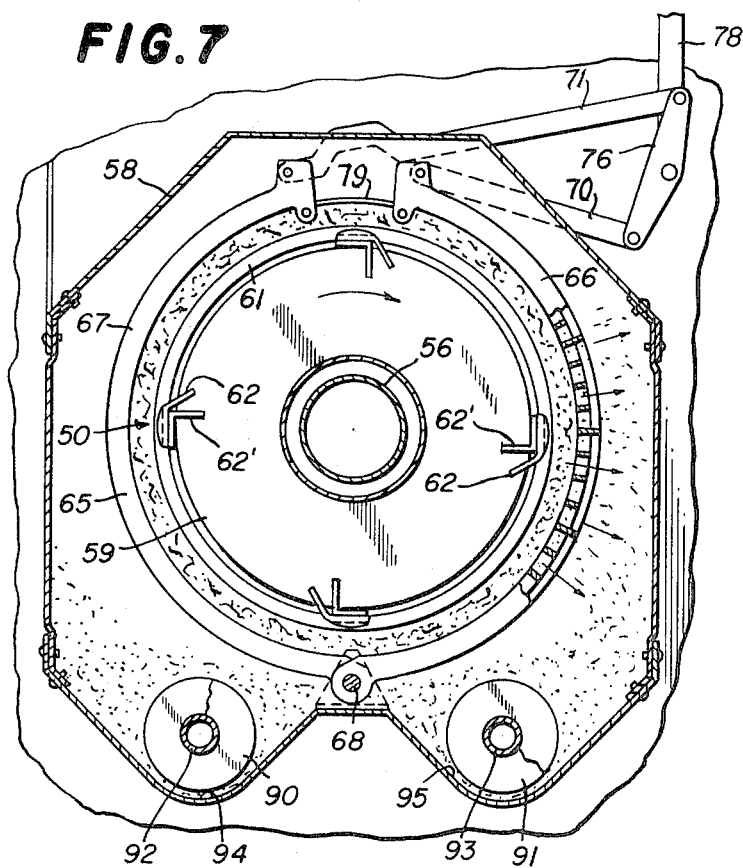
FIG. 7 is a cross section taken on the line 7-7 of FIG. 5.
Figure 8:
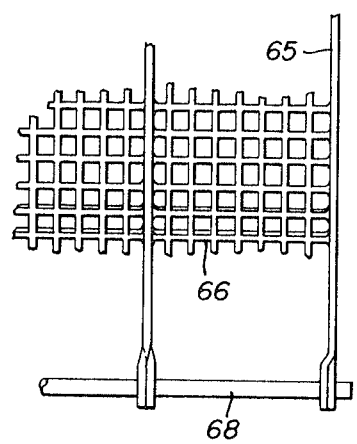
FIG. 8 is a fragmentary elevation showing a portion of the threshing cylinder grate.
Figure 9:
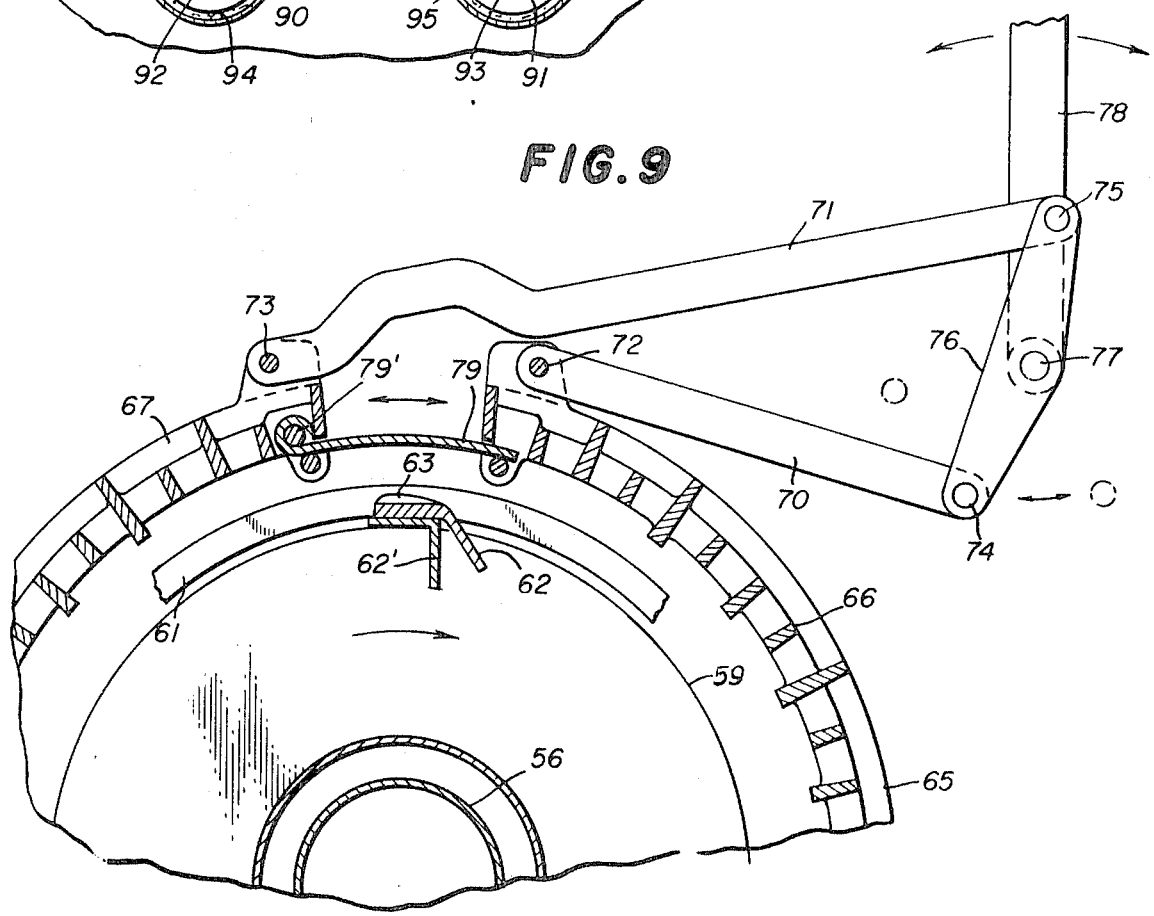
FIG. 9 is a fragmentary section taken on the line 9–9 of FIG. 5, to an enlarged scale, and with portions omitted.

The threshing cylinder 50 (FIGS. 1, 2, 4, 5 and 7 to 9) is mounted at the forward end of shaft 56 which extends longitudinally the entire length of the machine and which operates as a common shaft for both the threshing cylinder assembly 24 and the separator assembly 26. The shaft 56 is journaled in the end walls of the housing 58 which encloses the threshing cylinder assembly 24, the separator assembly 26 and the grain-transporting or conveying mechanism 28 and which forms the main part of the vehicle frame structure. The threshing cylinder 50 is mounted on the shaft 56 by a suitable internal framework which, as shown, may be axially spaced plates or discs 59 forming a supporting structure, and has a cone-shaped forward end 60 to which the material is delivered by the blower 47. Spiral blades 61 are mounted on the exterior surface of the cylinder 50 and its cone-shaped forward end 60 which advance the material along the threshing cylinder 50 to the separator assembly 26. The threshing cylinder 50 is also provided with longitudinally extending, circumferentially spaced rasp bars 62 with rasp teeth 63 which are generally parallel with the spiral blades 61, and which provide a combined threshing and feeding action. The rasp bars 62 are mounted on angle bars 62′ which are in turn mounted on the supporting plates 59. The threshing cylinder 50 rotates in a screen cage or grate 65 (FIGS. 7 to 9) through which the grain will pass and fall to the bottom of the housing 58. The grate 65 is formed in two sections 66 and 67 which are pivotally mounted on a longitudinally extending pivot shaft 68 and both halves of the clam shell-like arrangement are adjustable simultaneously for cylinder clearance. The adjusting mechanism as shown in FIGS. 7 and 9, comprises link bars 70 and 71 which are pivotally connected at 72 and 73 to the grate halves 66 and 67. At their other ends the link bars 70 and 71 are pivotally connected at 74 and 75 with opposite ends of an adjusting arm 76 which is mounted on a rock shaft 77. The rock shaft 77 is suitable journaled in the vehicle frame and operated by means of the lever 78 located at the operator's platform 15. The arrangement of the pivot points 74 and 75 relative to the axis of the rock shaft 77 is such that a high numerical ratio is obtained between the operating lever 78 and the grate sections 66 and 67 and that ratio is reduced as the grate sections are opened up for access to the cylinder 50. A small plate 79 (FIGS. 7 and 9) is pivotally mounted at 79′ on the one grate section 67 and has its free edge slidably supported on the other grate section 66 which serves to close the gap between the edges of the grate sections 66 and 67 when they are in operative position. The grate 65 completely encloses the threshing cylinder 50 and is readily opened by manipulation of the differential grate adjustment mechanism for unplugging, inspection and servicing, the plate 79 swinging about pivot 79′ out of the way, thereby providing ready accessibility to the cylinder 50. The b 360° threshing grate arrangement allows a high percentage of separation of grain from trash in the threshing area so that there is less separation to be done in the separator portion of the machine. The arrangement of the rasp bars provides more effective separation of the grain, since the material passes over more of the rasp bars, with lower cylinder speeds and consequently less grain damage than in other known threshing arrangements.

Figure 5:
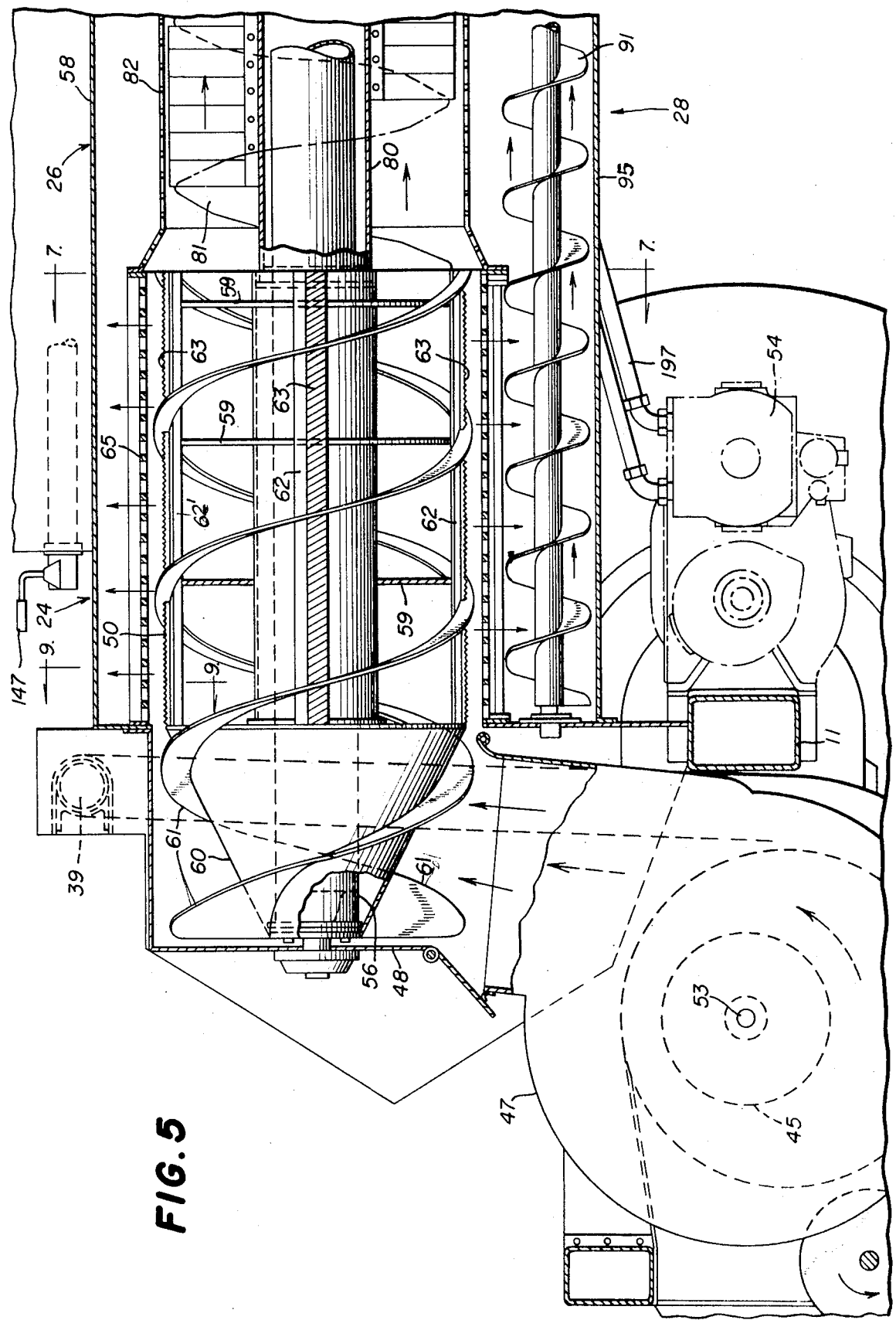
FIG. 5 is a partial, vertical, longitudinal section, to an enlarged scale, showing the front end portion of the machine, the view being taken on the longitudinal center line of the machine.
Figure 6:
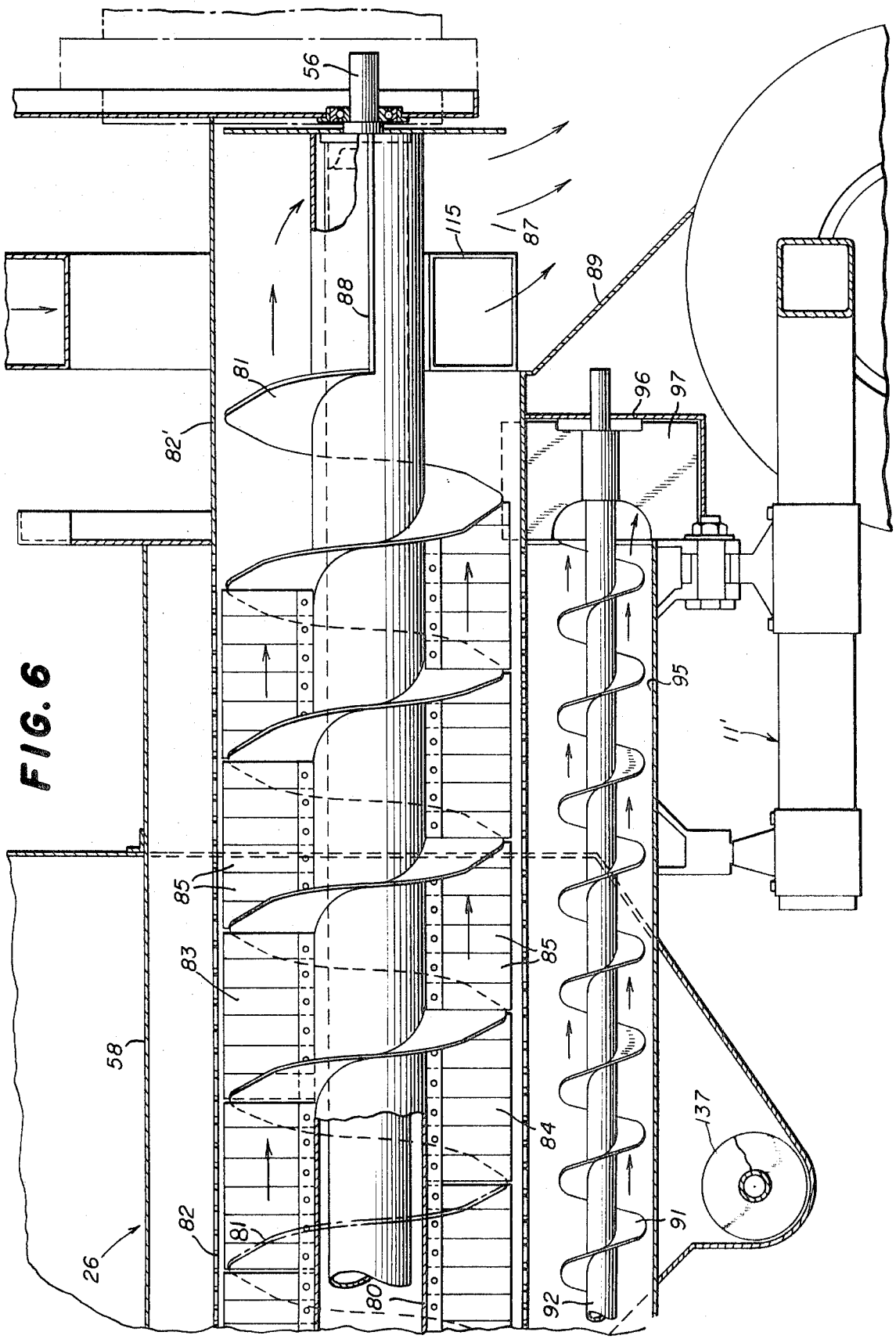
FIG. 6 is a partial, vertical, longitudinal section, to an enlarged scale, showing the rear end portion of the machine, the view being taken on the longitudinal center line of the machine.

The separator assembly 26 (FIGS. 6 and 14) comprises a tube member 80 which is carried on the shaft 56 and has a spiral feed blade 81. The auger thus formed is enclosed within a tubular member 82 of substantial diameter which extends concentric with the threshing cylinder 50 (FIG. 5). The tube 82 extends to the end of the housing 58 near the end of the supporting shaft 56 at the rear of the vehicle and the major portion thereof is perforated or formed of a grate or of wire or screen forming material. The auger support tube 80 has a pair of flexible sweeps 83 and 84 which extend between flights of the auger blade 81 and are in the form of individual flexible fingers 85 extending radially of the tube 80 and terminating short of the surrounding tube 82. The tube or screen cage 82 may be provided with stripper bars 86 which are circumferentially spaced and extend longitudinally on the inside wall thereof. A discharge opening 87 (FIG. 6) at the bottom of the imperforate rear end section 82' of the tube member 82 provides for discharge of the trash which is moved to the rear end of the separator assembly 26 by the auger blade 81. The auger blade 81 terminates short of the end of the support tube 80 and a pair of radially extending plates 88 form trash-ejecting paddles extending to the end of the tube 80. A guard plate 89 forms a discharge chute for directing the trash out of the rear of the machine. The flexible sweeps 83 and 84 which extend between the flights of the auger blade 81 assist in separation of the grain from the trash. In operation the bent-back sweeps give increased radial motion to the material and accelerate the movement of fines through the screen forming member 82. The periphery of the auger blade 81 is cut on chords, as shown in FIGS. 6 and 14, which reduces "rats nests," jamming and wadding of material. The blade configuration breaks up the wads of the grain and trash material and keeps it moving in a relatively thin layer and at a rate of speed or flow of the material which is relatively high so as to continue the advance of the material which is fed directly into the front end of the separator tube 82 from the threshing cylinder 50. The axially extending stripper bars 86 on the interior wall of the separator tube or screen 82 coact with the auger and help the material to advance through the tube.

The two grain transporting augers 90 and 91 (FIGS. 1 to 3 and 5 to 7) constitute the grain-advancing assembly 28 beneath the threshing cylinder 50 and separator tube 82. The augers 90 and 91 are mounted on longitudinally extending shafts 92 and 93 which are parallel with the main shaft 56 supporting the threshing cylinder 50 and the separator auger member 80. The augers 90 and 91 extend in through formations 94 and 95 along the bottom of the housing 58 and advance the material which is forced through the threshing grate 65 and the separator screen 82 to a slinger housing 96 at the rear end of the machine from which it is delivered by slingers 97 and 98 to the bottom of the auger 100 which is disposed vertically in the cleaner 30 (FIG. 14). The auger 100 operates within a vertically disposed tubular screen-forming member 101 which terminates at the bottom at a supporting ring 102 extending above an imperforate housing 103 to which the material is delivered by the slingers 97 and 98 through a chute 104 connecting the slinger housing 96 with the housing 103. The support ring is mounted on radial brackets 105 extending inwardly at the top of a troughlike pan 106 which surrounds the bottom of the auger 100 above the housing 103. The brackets 105 also support a cylindrical housing 107 which surrounds the screen 101 in concentric relation and is spaced outwardly thereof so that grain thrown through the screen 101 will be confined and fall down into the collecting pan 106. The housing 107 extends to the top of the auger 100 and terminates at the open bottom of a fan housing 108. A fan 109 is rotatably mounted on the upper end of the auger shaft 110 and operates to suck air upwardly through the compartment formed between the screen 101 and the cleaner housing 107 so as to separate the lighter chaff from the heavier grain which is thrown out through the screen 101. The auger 100 has a spiral blade 111 and a pair of flexible sweeps 112 and 113 (FIGS. 14 and 15) extending radially from the supporting tube 114 which aid in throwing the material outwardly against the screen 101. The sweeps 112 and 113 are of the same construction as the sweeps 83 and 84. The auger 100 carries the coarse chaff to the top of the screen 101 and into the fan 109 which discharges it into the chute 115. The pan 106 is open at the top and has a larger external diameter than the housing 107 and the latter terminates at the lower end at the top of the pan 106 so that the air is sucked upwardly by the fan 109 and discharged through the chute 115 which extends to the end of the machine and in which there is a pivotally mounted damper or gate 116. The damper forming gate 116 is controlled manually or otherwise and serves to choke the exhaust from the fan 109 so as to control the operation of the cleaner 30. The chute 115 discharges the waste material from the cleaner 30 and the end thereof is located adjacent the discharge opening 87 (FIG. 6) at the rear end of the separator tube 82 so as to spread the straw or trash discharged from the separator. Provision may be made for diverting the air discharged from the chute 115 so as to allow the straw to lie in a window.

The clean grain which falls into the pan 106 is moved by conveyor blades 117 (FIG. 14) which are mounted on a radially extending frame 118 attached at the bottom of the auger tube 114, to an opening in the bottom of the pan 106 and into chute 119 (FIG. 10) which empties into one compartment of a double-compartment slinger housing 120. A double slinger 121 is carried on a single shaft 122 supported in vertically extending wall portions 123 and 124 of the chute 119 and the lower portion of the grain storage tank 34. The slinger housing 120 is divided into two sections or compartments 125 and 126 by a vertically extending partition 127 and the slinger assembly 121 comprises two sets of slinger blades 128 and 129 which are housed in the compartments 125 and 126, respectively. A discharge opening 130 (FIG. 13) near the top of the compartment 125 is connected by chute 131 with the top of the storage tank 34 for delivering the cleaned grain into the storage tank. A fanlike distributor 132 (FIG. 1) is mounted inside the top of the tank 34 for distributing the grain in the tank. A grain trap 200 (FIGS. 10 and 13) is provided in the wall of the chute 131 which opens at the bottom into the grain storage tank above the bottom wall 34' of the tank to prevent grain which does not reach the top of the chute from falling back into the slinger compartment 125 when the blades 128 stop rotating. The compartment 126 has an opening 133 (FIG. 12) at the top thereof which connects with an unloading chute 36 extending outwardly of the side of the machine and is adapted to discharge into a grain bin vehicle or the like. The slinger blades 128 and 129 are curved as shown in FIGS. 12 to 14 and this backward curvature tends to reduce grain damage by reducing radial velocity of the grain out to the slinger housing. A grain trap 201 is provided in the wall of the unloading chute 36 as shown in FIG. 12 which empties into the storage tank 34 to prevent any grain which does not reach the top of the chute from falling back into the slinger compartment 126 when the blades 129 stop rotating. The compartment 126 has an opening 134 in the end wall 135 connecting the same with a cross compartment 136 at the bottom of the storage tank 34. A cross auger 137 is mounted in the compartment 136, with its shaft 138 journaled in the sidewalls of the compartment 136, which cross auger has right- and left-hand blade sections for moving grain to an area opposite opening 134 where it is thrown into the compartment 126 by paddles 139 for removal through the unloading chute 36. The slinger blades 129 are cut away at 140 to facilitate entry of the grain into the compartment 126. A gate 141 (FIGS. 11 and 16) for the opening 134 is mounted for vertical sliding movement in track forming members 142. The gate 141 is connected to the lower end of a lifting bar or rod 143 (FIG. 10), the upper end of which is turned over and pivotally connected at 144 to a radial arm 145 on a longitudinally extending rock shaft 146 having an operating handle 147 at the forward end and having an arm 148 at the rear end connected to the upper end of cable 149 for operating a bellcrank 150 which is pivoted at 151 to a fixed frame bracket 152 and controls a clutch mechanism 154 on the constantly driven slinger shaft 122. The slinger shaft 122 carries a drive pulley 155 which is connected by a drivebelt 156 (FIGS. 6, 10, 17 and 18) with the pulley 157 on a constantly driven shaft 158. A pulley 160 is mounted on the shaft 122 and adapted to be connected to rotate with the shaft by operation of the associated clutch 154 so as to drive the cross auger 137 through drivebelt 161 running over idler pulleys 162 to pulley 163 on the end of the auger shaft 138. Operation of handle 147 simultaneously opens the gate 141 and engages clutch 154 so that the grain can pass through opening 134 into the slinger housing compartment 126 as the auger 137 begins to turn.

Power for operating the moving components of the combine is derived from an output shaft 170 on the power plant or engine 14 which is mounted above the rear wheel opposite the cleaner mechanism 30. Pulley 171 and drivebelt 172 connects shaft 170 with pulley 173 on upper drive shaft 174. Variable speed pulley 175 and drivebelt 176 connects the drive shaft 174 with a variable speed pulley 177 on a variable speed mechanism having an output shaft 178 with a chain and sprocket drive connection 179 with the main shaft 56 of the thresher and separator. The power shaft 174 has a pulley 180 which is connected by drivebelt 181 traveling over idlers 182 with a pulley 183 on the fan shaft 184 for driving the fan 109 at the top of the cleaner assembly 30. The shafts 92 and 93 of the grain augers 90 and 91 are connected by pulleys 185, 186 and the drivebelt 187. The shaft 93 carries a pulley 188 which is connected by a drivebelt 189 with a pulley 190 on the lower drive shaft 158. The lower drive shaft 158 is connected by pulley 191 and belt 192 with a pulley 193 on the power output shaft 170. A small pulley 194 on the shaft 92 is connected by drivebelt 195 with a pulley 196 on the bottom of the shaft 110 for driving the auger 100 in the cleaner 30. The gear box 54 for the front axle assembly 11 at the front of the machine is driven through hydrostatic lines 197 connecting with a hydrostatic pump 198 at the forward end of the engine 14.

In operating the combine, a header is attached to the forward end of the vehicle frame which is constructed to cut and gather the crop which is to be harvested. The rotating elements of the machine are driven continuously from the power drive shaft except for the cross auger 137 on the grain bin which is under the control of the operator through the clutch 154. The crop material delivered by the header is fed by the auger 45 to the blower 47 which elevates the same in the chute 48 to the cone-shaped end of the threshing cylinder 50 from which it is advanced through the threshing mechanism 24 to the separator 26 and carried through the separator tube 82 by the auger blades 81. The grain and fine chaff passing through the threshing grate and the separator tube as a result of the threshing and separating operations drops to the conveyor mechanism 28 in the bottom of the housing 58 where the augers 90 and 91 advance the same to slingers 97 and 98 at the end of the housing 58. This material is delivered through the chute 104 to the bottom of the cleaner 30 and elevated by the auger 100, being thrown against the screen 101 with the lighter chaff being carried upwardly in the cleaner housing 107 by the operation of the suction fan 109 and the cleaned grain dropping to the pan 106 at the base of the housing 107 where it is carried by paddles 117 to chute 119, whereby the grain falls into the slinger chamber 125, to be thrown by slinger blades 128 up chute 131 into storage tank 34. The chaff sucked upwardly in the cleaner housing 107 by the fan 109 and the coarse chaff moved upwardly by the auger is discharged through the chute 115, the end of the latter being adjacent the trash discharge opening 87 of the separator and the air from the cleaner normally helping to distribute the trash discharged from the separator. The shaft 122 carrying the slinger 128 also carries the slinger 129 for discharging the grain delivered to the latter through the discharge chute 36. The auger 137 with clutch and pulley is operated to transfer grain from the bottom of the storage tank 34 through the opening 134, when gate 141 is raised for discharge from the machine.

While particular materials and specific details of construction have been referred to in describing the illustrated form of the machine, it will be understood that other materials and equivalent structural details may be resorted to within the spirit of the invention.

We claim:

1. A combine harvester for grain crops comprising a crop-gathering header mounted at the forward end of the machine, a threshing cylinder mounted above the header and rotatable on an axis extending longitudinally of the machine, a crop-elevating apparatus disposed rearwardly of the header for lifting the gathered crop from the header to the front end of the threshing cylinder, the threshing cylinder having means for advancing the material in the direction of the axis of rotation and for threshing the material while it is advancing, a perforated separating tube extending longitudinally of the machine and disposed to receive the threshed material directly from the threshing cylinder, means associated with the separating tube for advancing the material in a relatively thin layer therein and for separating the grain while the material is being advanced to a trash discharge opening adjacent the rear of the machine, a grain-cleaning mechanism disposed adjacent the rear of the machine, a conveyor for collecting the grain and fine material resulting from the operation of the threshing cylinder and the separating tube and for advancing the same to the grain cleaning mechanism, said grain cleaning mechanism having means for separating the fine and coarse trash from the grain, means for discharging the trash and means for delivering the cleaned grain for transfer to a storage container.

2. A combine harvester as set forth in claim 1, and said crop-elevating apparatus comprising a blower and a chute forming, scroll-like housing extending about the forward end of the threshing cylinder.

3. A combine harvester as set forth in claim 1, and said threshing cylinder having a cone-shaped extension at the forward end thereof to which the crop material is delivered by the elevating apparatus.

4. A combine harvester as set forth in claim 1, and said threshing cylinder having a cylindrical grate encompassing the cylinder through which grain and fine trash are forced upon rotation of the cylinder.

5. A combine harvester as set forth in claim 1, and said threshing cylinder having spiral auger blades on its exterior surface for advancing the material in the direction of the axis of rotation thereof.

6. A combine harvester as set forth in claim 5, and said threshing cylinder having rasp bars on its exterior surface with rasp teeth extending in a direction generally parallel with the spiral blades thereon.

7. A combine harvester as set forth in claim 5, and said threshing cylinder having axially extending, circumferentially spaced rasp bars on the exterior surface.

8. A combine harvester as set forth in claim 1, and the means on said threshing cylinder for advancing and threshing the material including a spiral auger blade and a plurality of axially extending, circumferentially spaced rasp bars mounted on the periphery of said cylinder between the flights of said spiral blade and cooperating with said auger blade.

9. A combine harvester as set forth in claim 1, and said threshing cylinder and said separator tube being mounted on a common axis extending longitudinally of the machine.

10. A combine harvester as set forth in claim 1, and said threshing cylinder and the means for advancing the material in the separating tube being mounted on a common shaft extending longitudinally of the machine.

11. A combine harvester as set forth in claim 1, and said threshing cylinder and the means for advancing the material in the separating tube being mounted on parallel axes which extend longitudinally of the machine.

12. A combine harvester as set forth in claim 1, and auger means for advancing the material in the separating tube.

13. A combine harvester as set forth in claim 12, and said auger means having a spiral blade, the free edge of which is cut on chords so as to assist in breaking up wads of the material as the material advances in the separator tube.

14. A combine harvester as set forth in claim 1, and said separator tube having an auger means for advancing the material in the tube, which auger means comprises a hollow shaft member with a spiral blade and radially extending, flexible sweeps mounted on said shaft member between the flights of said spiral blade.

15. A crop harvester comprising a vehicle frame, a crop-gathering header disposed at the forward end of said vehicle frame, a threshing cylinder mounted within a tubular grate for rotation on an axis extending longitudinally of said vehicle frame, means for advancing grain or other crop material gathered by the header to the forward end of the threshing cylinder, means associated with the threshing cylinder for advancing the material while it is being threshed in the direction of its axis of rotation and for discharging the material at the rearward end thereof, a perforated separating tube extending longitudinally of said vehicle frame and positioned to receive at its forward end the material discharged from the rearward end of the threshing cylinder, means in the separating tube for advancing the material remaining therein toward a trash discharge opening at the rear of the vehicle, a vertically disposed cleaner apparatus adjacent the rear end of the vehicle, a conveyor extending in generally parallel relation beneath the threshing cylinder and the separating tube and associated means for delivering the grain and fine trash material dropping to said conveyor from the threshing cylinder and separating tube to the cleaner apparatus, said cleaner apparatus having associated means for separating the fine trash from the grain and discharging the trash at the rear end of the vehicle frame, a storage tank mounted on the vehicle frame, means for delivering the cleaned grain to the storage tank, and means for unloading grain from the storage tank.

16. A crop harvester as set forth in claim 15, and said threshing cylinder and separating tube being enclosed in a housing forming the vehicle frame, said housing extending longitudinally of the vehicle and through the storage tank.

17. A crop harvester as set forth in claim 15, and a frame-forming housing extending longitudinally of said vehicle, said threshing cylinder and said separating tube being enclosed in said housing, said housing having a trough formed along the bottom thereof and an auger conveyor mounted in said trough for advancing the grain and fine trash dropping from the threshing cylinder and the separating tube to a point at the rear of the vehicle frame for delivery to the cleaner apparatus.

18. A crop harvester comprising a support means, a threshing cylinder mounted within a tubular grate for rotation on an axis extending longitudinally of said support means, means for feeding grain or other crop material to the forward end of the threshing cylinder, means associated with the threshing cylinder for advancing the material while it is being threshed in the direction of its axis of rotation and for discharging the material at the rearward end thereof, a perforated separating tube extending longitudinally of said support means and positioned to receive the material discharged from the rearward end of the threshing cylinder, means in the separating tube for advancing the material while it is being separated toward a trash discharge opening at the rear of the machine, a vertically disposed cleaner apparatus adjacent the rear end of the support means, a conveyor extending in generally parallel relation beneath the threshing cylinder and the separating tube and associated means for delivering the grain and fine trash material dropping to the conveyor from the threshing cylinder and separating tube to the cleaner apparatus, said cleaner apparatus having means for separating the fine trash from the grain and discharging the trash, a storage tank, means for delivering the cleaned grain to the storage tank, and means for unloading the grain from the storage tank.

19. A crop harvester as recited in claim 18, and said cleaner apparatus including a screen-forming, vertically disposed, perforated cylinder, an auger rotatably mounted in the screen for raising the material from a bottom receiving area and throwing the same against the screen, a vertically disposed housing enclosing said screen with the inside of said housing spaced from said screen, a driven fan at the top of said housing operated to suck air upwardly between the screen and housing so as to draw fine trash upwardly while the heavy grain drops to a collecting area at the bottom thereof, and a trash discharge chute connected to the top of said housing for receiving the fine trash and discharging the same.

20. A crop harvester as recited in claim 18, and said cleaner apparatus having a vertically extending, cylindrical screen, an auger for raising grain and fine trash material within the screen, a fan which is operative to force air upwardly along the surface of the screen so as to drive light trash upwardly and a trash discharge chute communicating with the top of the cleaner apparatus so as to receive the trash for discharge.

21. A crop harvester as recited in claim 20, and said chute having a discharge end which is adapted to be disposed adjacent the trash discharge opening in the separator tube so as to aid in scattering trash discharged from the separator tube.

22. A crop harvester as recited in claim 20, and said trash discharge chute having a damper means therein which is adjustable so as to control the flow of air through the cleaner apparatus.

23. A crop harvester as recited in claim 18, and said means for delivering the cleaned grain to the storage tank comprising a tray adjacent the bottom end of the cleaner apparatus for receiving the cleaned grain, a chute connected at one end to said tray, a slinger member mounted in a housing connected to the other end of the chute for receiving the grain, an upwardly extending chute connected at its lower end with the slinger housing and discharging at its upper end into the storage tank, and a second slinger member which is operative to force grain from the storage tank through an upwardly extending unloading chute.

24. A combine harvester for grain crops comprising a vehicle having means forming an elongate supporting frame, a crop-gathering header mounted at the forward end of the supporting frame, a threshing cylinder rotatably mounted on an axis extending longitudinally of the supporting frame, means for delivering the gathered crop from the header to the threshing cylinder, the threshing cylinder having auger means for advancing the material rearwardly along the axis of rotation and means for threshing the material while it is advancing, a separating tube extending longitudinally of the supporting frame and receiving the threshed material directly from the threshing cylinder, said separating tube having a trash discharge opening at the rearward end and auger means for advancing the material therein to said trash discharge opening, means operative within the separating tube for separating the grain while the material is being advanced to said trash discharge opening, and said auger means for advancing the material in the threshing cylinder and the separating tube being rotated on a common axis.

25. A combine harvester for grain crops comprising a vehicle having means forming an elongate supporting frame, a crop-gathering header mounted at the forward end of the supporting frame, a threshing cylinder rotatably mounted on an axis extending longitudinally of the supporting frame, means for delivering the gathered crop from the header to the threshing cylinder, the threshing cylinder having means for advancing the material rearwardly along the axis or rotation and for threshing the material while it is advancing, a separating tube extending longitudinally of the supporting frame and receiving the threshed material directly from the threshing cylinder, rotating means operative within the separating tube for advancing the material therein and for separating the grain while the material is being advanced to a trash discharge opening, said threshing cylinder and said means for advancing the material in the separating tube being rotated on a common axis, an elongate housing enclosing said threshing cylinder and separating tube and having screw conveyor means operative on a longitudinal axis in the bottom of said housing for collecting and advancing grain and fine trash from the threshing cylinder and the separating tube to a discharge area for transfer from said housing.

26. In a crop-harvesting machine, a threshing cylinder, means for rotating the cylinder about its longitudinal axis, a threshing grate comprising semicylindrical members hingedly connected for swinging movement relative to each other so as to form, when closed, a cylindrical shell extending about the threshing cylinder, and a linkage connecting the free edges of the grate members which is adapted to be operated to swing the members so as to provide access to the threshing cylinder.

27. In a traveling crop-harvesting machine a threshing cylinder rotatably mounted on a supporting frame with its axis extending longitudinally of the machine, a crop-gathering header arranged forwardly of the threshing cylinder with its discharge end below the crop-receiving end of said threshing cylinder and apparatus for delivering the crop material gathered by the header to the crop-receiving end of the threshing cylinder which comprises a chute leading to the threshing cylinder and a fan disposed at the inlet end of said chute and operating to produce a stream of air which carries the material through the chute to the threshing cylinder.

28. In a traveling crop-harvesting machine having a rotatable threshing cylinder mounted on a supporting frame, the combination with a crop-gathering header arranged forwardly of the threshing cylinder and apparatus for delivering the crop material gathered by the header to the crop-receiving end of the threshing cylinder which comprises a chute leading to the threshing cylinder and a fan operating to produce a stream of air which carries the material through the chute to the threshing cylinder, said cylinder having its crop-receiving end disposed above the discharge end of the header and said chute leading upwardly from adjacent the fan and terminating in a housing which extends about the receiving end of the threshing cylinder.

29. In a combine harvester having a threshing cylinder with means to feed gathered crop material thereto, separator and cleaner mechanisms, and a grain storage tank with associated means to collect the grain resulting from the threshing, separating and cleaning operations, said storage tank being closed and having a loading chute with its discharge end adjacent the top of said tank, and a distributor wheel rotatably mounted adjacent the discharge end of the chute having blades which extend into the path of grain which is emerging from the chute so that the distributor wheel is driven by the flow of grain and distributes the grain in the tank.

30. In a crop-harvesting machine, a vertically disposed cleaner mechanism, means for gathering the crop material, means for threshing and separating the crop material and means for delivering the grain and trash resulting from the threshing and separating operations to the cleaner mechanism, said cleaner mechanism comprising means operative to supply an airstream, means for lifting the grain and trash into the airstream which operates to carry the trash out of the cleaner mechanism and allows the grain to fall by gravity into a collecting area at the bottom of the cleaner mechanism, and housing means enclosing the lifting means and confining the airstream for movement in an upward path.

31. In a crop harvesting machine as recited in claim 30, and a trash discharge chute connected to said cleaning mechanism housing through which the airstream is exhausted from said housing so as to carry off the trash.

32. In a crop-harvesting machine as recited in claim 31, and an adjustably mounted damper forming member in said trash discharge chute which may be adjusted to control the movement of the air in the cleaner mechanism.

33. In a crop-harvesting machine as recited in claim 30, and said cleaner mechanism having a fan mounted in the upper end of said housing which constitutes said means to supply said airstream.

34. In a crop-harvesting machine as recited in claim 30, and said lifting means being enclosed in a vertically disposed, generally cylindrical imperforate housing and a perforated screen-forming cylinder disposed in spaced relation between said lifting means and said housing.

35. In a crop-harvesting machine as recited in claim 30, and said lifting means comprising a vertically disposed auger member with means for driving the same so as to move the material upwardly and throw the same outwardly of the axis of the auger.

36. In a crop-harvesting machine as recited in claim 35, and said auger member having sweeps between the reaches of the auger blade so as to assist in the separation of the grain and fine trash from the coarse trash.

37. In a crop-harvesting machine as recited in claim 34 and said means for delivering the grain and trash material to the cleaner mechanism including chute-forming means discharging the material in the area below the bottom of the screen-forming cylinder.

38. In a crop-harvesting machine as recited in claim 35, and said means to supply said airstream comprising a fan mounted for rotation on a common vertical axis with said vertically disposed auger.

39. In a crop-harvesting machine as recited in claim 38, and means for driving said auger member and said fan independently of each other so as to enable the flow of air and the movement of the material to be separately controlled.

40. In a crop-harvesting machine having a threshing cylinder, means for feeding crop material to the threshing cylinder and a separating mechanism disposed to receive material from the threshing cylinder, said separating mechanism comprising an elongate perforated tube, and an auger device rotatable within said tube for advancing the material received from said threshing cylinder at one end thereof to a trash discharge opening at the other end of said tube, said auger device having sweeps between the reaches of the auger blade and axially extending stripper bars spaced about the inside surface of said tube for assisting the axial flow of the material through said tube.

41. In a crop-harvesting machine, a separator comprising a perforated tube and a rotatably mounted auger operative in the tube to advance the crop material through said tube, said auger having a spiral blade and the periphery of the blade being cut on chords to assist in breaking up bunches of the material as it advances in the tube.

42. In a crop-harvesting machine, a threshing cylinder disposed generally horizontal at the front end of the machine with the axis thereof extending longitudinally of the machine, a separator aligned with the threshing cylinder, a header, and means for feeding crop material gathered by the header into the front end of the threshing cylinder, said means for feeding the crop material to the threshing cylinder comprising a chute connecting the discharge end of the header with a crop-receiving bottom opening in the front end of the threshing cylinder and a blower in said chute which is operative to direct an airstream through said chute to carry the crop material to the opening in the front end of the threshing cylinder.

43. In a crop-harvesting machine, a vertically disposed cleaner mechanism, means for gathering the crop material, means for threshing and separating the crop material, and means for delivering the grain and trash resulting from the threshing and separating operations to the cleaner mechanism, said cleaner mechanism comprising a vertically disposed screen forming tube, an auger device for lifting the grain and trash in the tube, a fan at the top of the tube which operates to produce an airstream along the surface of the tube and into a trash discharge chute so as to carry trash out of the cleaner mechanism and which allows grain thrown through the screen to fall by gravity into a collecting area at the bottom of the cleaner mechanism, housing means enclosing said screen and confining the airstream for movement in an upward path and said auger device operating to move coarse trash to the top of the screen-forming tube and into the fan where it is thrown into the trash discharge chute by the fan.

44. In a combine harvester having a threshing cylinder with means to feed gathered crop material thereto, a separator apparatus and a cleaner mechanism, and means to collect the grain resulting from the threshing, separating and cleaning operations, a grain storage tank, a chute leading to the storage tank, a slinger at the entrance to the chute for forcing the grain through the chute and into the storage tank, and means to deliver the cleaned grain from the cleaner mechanism to the slinger, said chute having its discharge end at an elevation above said slinger, and the downside wall of said chute above the slinger having a grain trap into which grain left in the chute upon discontinuing operation of the slinger will fall.

45. In a combine harvester having a threshing cylinder with means to feed gathered crop material thereto, a separator apparatus and a cleaner mechanism, and means to collect the grain resulting from the threshing, separating and cleaning operations, a grain storage tank, a chute leading to the storage tank, a slinger for forcing the grain through the chute and into the storage tank, and means to deliver the cleaned grain to the slinger, said chute having its discharge end at an elevation above said slinger, and a grain trap in said chute into which grain left in the chute upon discontinuing operation of the slinger will fall, a chute for unloading said grain storage tank which is connected at the bottom with the grain storage tank, and an unloading slinger at the bottom of said unloading chute, said unloading chute having a grain trap in the downside wall into which grain will fall when left in the chute upon discontinuing operation of the unloading slinger.

46. In a combine harvester having a threshing cylinder with means to feed gathered crop material thereto, a separator device, and a cleaner mechanism with associated means to advance the crop material through the same and means to collect the grain resulting from the threshing, separating and cleaning operations, a grain storage tank, a loading chute leading to the storage tank, and means for delivering the grain through the loading chute and into the storage tank, an unloading chute for said storage tank, a slinger at the bottom of said unloading chute, said unloading slinger having slinger blades mounted on a rotating shaft in a housing disposed at the bottom of said storage tank, an inlet opening in said slinger housing for passage of grain from said storage tank into said slinger housing, a gate for closing said inlet opening so as to shut off the flow of grain, means for delivering grain from the storage tank through said inlet opening, and control means for opening said gate and for operating said means for delivering grain from the storage tank through said inlet opening when said gate is open.

47. In a combine harvester as recited in claim 46 and said means for delivering the grain through the loading chute and into the storage tank comprising a slinger housing at the bottom of the loading chute which adjoins the housing for the unloading slinger and rotatable slinger blades mounted on the drive shaft which carries the slinger blades for the unloading slinger.

48. In a combine harvester as recited in claim 46 and the means for delivering grain from the storage tank through said inlet opening comprising a power-driven conveyor, a clutch-controlled drive means connecting said conveyor with said unloading slinger shaft and said control means being operable to simultaneously open said gate and operate the clutch to drive said conveyor.